(12) United States Patent
Niinikoski et al.

(10) Patent No.: US 6,753,377 B1
(45) Date of Patent: Jun. 22, 2004

(54) POLYMER DISPERSION AND METHOD TO PRODUCE THE SAME

(75) Inventors: Mari Niinikoski, Rusko (FI); Kari Nurmi, Raisio (FI); Anna-Liisa Tammi, Paimio (FI)

(73) Assignee: Raisio Chemicals, Ltd. (FI)

( * ) Notice: Subject to any disclaimer, the term of this patent is extended or adjusted under 35 U.S.C. 154(b) by 0 days.

(21) Appl. No.: 09/890,784

(22) PCT Filed: Feb. 7, 2000

(86) PCT No.: PCT/FI00/00084

§ 371 (c)(1),
(2), (4) Date: Aug. 6, 2001

(87) PCT Pub. No.: WO00/46264

PCT Pub. Date: Aug. 10, 2000

(30) Foreign Application Priority Data

Feb. 5, 1999 (FI) .................................................. 990229

(51) Int. Cl.⁷ .............................. C08L 3/00; C08L 89/00
(52) U.S. Cl. ....................... 524/734; 524/827; 524/831; 524/832; 524/47
(58) Field of Search ......................... 524/734, 47, 343, 524/832, 833; 526/341, 347.2, 200, 238.22, 319; 525/54.24, 54.26

(56) References Cited

U.S. PATENT DOCUMENTS

| 4,301,017 A | * | 11/1981 | Kightlinger et al. | ....... 252/8.83 |
| 4,375,535 A | * | 3/1983 | Kightlinger et al. | ....... 527/313 |
| 4,835,212 A | | 5/1989 | Degen et al. | |
| 4,855,343 A | | 8/1989 | Degen et al. | |
| 4,940,514 A | | 7/1990 | Stange et al. | ............ 162/168.2 |
| 5,130,395 A | * | 7/1992 | Nguyen et al. | ............. 527/300 |
| 5,536,779 A | | 7/1996 | Wendel et al. | |
| 5,591,489 A | | 1/1997 | Dragner et al. | |
| 6,040,379 A | * | 3/2000 | Luebke et al. | ............. 524/734 |
| 6,426,381 B1 | * | 7/2002 | Konig et al. | ................. 524/734 |
| 2001/0003760 A1 | * | 6/2001 | Luukkonen | .................. 524/47 |

FOREIGN PATENT DOCUMENTS

| DE | 1621694 A1 | 6/1971 |
| DE | 1 621 694 | 6/1971 |
| DE | 0 301 372 A1 | 5/1989 |
| DE | 3702712 A1 | 5/1989 |
| DE | 19806745 | 2/1998 |
| DE | 19728789 | 1/1999 |
| DE | 19810903 | 9/1999 |
| EP | 0194987 A2 | 8/1987 |
| GB | 1095123 | 12/1967 |
| JP | 1095006 | 5/1986 |
| JP | 7109691 | 4/1995 |
| JP | 8060591 | 3/1996 |
| JP | 10183493 | 7/1998 |
| WO | WO 93/10305 | 5/1993 |
| WO | WO 94/05855 | 3/1994 |
| WO | WO 97/16595 | 5/1997 |
| WO | WO 97/46591 | 12/1997 |
| WO | WO 99/42490 | * 8/1999 |
| WO | WO 00/48264 | 8/2000 |

* cited by examiner

*Primary Examiner*—Katarzyna Wyrozebski
(74) *Attorney, Agent, or Firm*—Connolly, Bove Lodge & Hutz LLP

(57) ABSTRACT

The invention relates to a starch-based polymer dispersion, which contains a copolymer of starch with monomers. The invention also relates to a process for the preparation of said dispersion and its use as a surface sizing additive for paper and as a wet- and dry-strengthener for paper which is added to the wet end of the paper machine.

30 Claims, No Drawings

POLYMER DISPERSION AND METHOD TO PRODUCE THE SAME

The invention relates to starch-based polymer dispersion, which contains a co-polymer of starch with monomers. The invention also relates to a process for the preparation of said dispersion and its use in paper manufacture, particularly as a surface sizing additive for paper and as a wet- and dry-strengthener for paper which is added to the wet end of a paper machine. The term paper as used in this invention refers to both paper and paperboard, which are prepared by using either a wood-containing or a chemically processed fibre or a recycled fibre or a mixture thereof. These papers include fine papers, LWC papers, SC papers and newsprint papers, packing boards and folding boxboards.

U.S. Pat. No. 4,301,017 (Standard Brands Inc.) discloses an aqueous polymeric dispersion, which is produced by co-polymerization of at least one vinyl monomer in an aqueous solution of a thinned/degraded starch derivative. The starch derivatives used were diethylaminoethyl, acetyl, cyanoethyl or carbamoethyl derivatives. Such derivatives are just slightly ionic at neutral pH values, and in paper-making processes, best functioning is achieved only at low pH values (pH<6) in which they are partly ionized. Nowadays, most papermaking processes are neutral, and, consequently, polymers should also act at pH values in the range from 6 to 9, preferably from 7 to 8.5. The degree of substitution of the starch used in the above mentioned patent and having the above mentioned substituents should be at least 0.05. Before polymerization, starch is degraded/thinned enzymatically to a preferable intrinsic viscosity value ranging from 0.12 to 0.28 dl/g. Ce(IV) salts have been used as a polymerization catalyst (initiator).

Patent DE 37 02 712 (U.S. Pat. No. 4,835,212; BASF AG) describes the preparation of polymer dispersions from starches having an intrinsic viscosity of from 0.04 to 0.12 dl/g. Also the starches used in this patent are enzymatically highly degraded before the polymerization. In the examples, slightly cationic commercial starches have been used which have a maximum degree of substitution (DS) of 0.07. As monomers, in patent DE 3,702,712 it was used from 40 to 140 parts by weight, based on the total polymer, of a monomer mixture containing from 20 to 65% by weight of acrytonitrile or methacrylonitrile, from 80 to 35% by weight of acrylic acid esters and from 0 to 10% by weight of other co-polymerizable monomers. Peroxides were used as catalysts.

It is an object of this invention to provide dispersions which have a novel composition and an improved reactivity in comparison with the prior known dispersions, and a good retention and adherence to paper fibres. The dispersions according to the invention can be used as an additive in paper surface sizing and as a wet- and dry-strengthener for paper which is added to the wet end of a paper machine. The invention also relates to a process for the preparation of said dispersions.

In surface sizing, different kinds of polymers are generally added to the surface-sized starch in order to improve printability. These polymers can be copolymers of styrene with maleic acid, various acrylates etc. In these cases, the effect of the expensive polymers added will not be totally utilized, while the polymers are not completely inter-miscible with starch (thermodynamic solubility coefficients differ too much from each other), and thus they do not form a completely inter-miscible polymeric network (interpenetrating network) while drying.

It is one object of the present invention to produce polymer particles which have a surface structure similar to that of the used surface sizing starch, and, consequently, these two achieve a completely interpenetrating network. This is achieved by using as a polymer intermediate and a starting batch the same starch as or a starch chemically similar to the starch in the surface sizing agent itself. Then the particles formed during the polymerization remain in the starch film and are not separated during drying. If the starch is enzymatically degraded before the polymerization, other means are needed than only the starch itself for stabilizing the polymer, for example an emulsifier or water soluble monomers. In that case, the surface structure of the polymer is no longer similar to that of the surface sizing starch.

A copolymer suitable to be added into the pulp on a paper machine can be prepared by customizing for each paper machine a starch derivative having a cationic value and other properties suitable for the wet end system of the machine. Also herein, the guiding principle is that the surface structure of the polymer particles is as similar as possible as the molecular structure (molecular weight, cationic value, branching etc.) of the starch or the starch-based strengthener used at the wet end. Then the polymers are not separated from the starch matrix while drying but form a completely interpenetrating network.

Unlike in the two processes mentioned above, in the present invention it is possible to produce copolymers by using non-degraded or only slightly oxidized (e.g. peroxide- or hypochlorite-oxidized) starch. For example, the starch can be potato starch, corn starch, barley starch, wheat starch or tapioca starch, of which the potato starch and corn starch are preferable. The starch is not enzymatically degraded before the polymerization, and thus it has an intrinsic viscosity of at least 1.0 dl/g, preferably from 1.5 to 15 dl/g, and most preferably from 3 to 15 dl/g.

The polymer dispersion according to the invention is stable, and its viscosity does not increase too much during any preparation step. By using the oxidized starch, the carboxylic groups formed in the oxidation can also be utilized in the stabilization of the polymer. Because of the higher molecular weight of starch, it stabilizes the particle also sterically. Furthermore, the ionic groups formed in the oxidation and cationization stabilize the particle, and thus the water-soluble monomers are not necessary for the stabilization of the particle in the polymerization. In the enzymatic treatment of the starch, such stabilizing groups are not formed and the steric stabilization is disappeared as well, and then it is necessary to use emulsifiers, which are generally known to impair sizing. At the same time, the strength properties of the paper are drastically impaired.

During the preparation of the polymer dispersions according to the invention, the starch is preferably cationized by a suitable cationizing chemical depending on the intended use so that in surface sizing applications the DS values are in the range from 0.01 to 1.0, preferably from 0.01 to 0.08, and in pulp sizing applications in the range from 0.05 to 1.0, preferably from 0.08 to 1.0, and more preferably from 0.1 to 0.5. However, a native or anionized starch can be used as well.

If the starch is cationized, suitable cationizing chemicals include cationizing chemicals containing quaternary nitrogen, for example 1,3-epoxy or 1,3-hydrochloride derivatives. 2,3-Epoxypropyltrimethyl ammonium chloride is a preferable cationizing chemical. Cationizing is performed when the starch is in soluble form in an alkaline aqueous solution (pH>7, preferably from 9 to 11). Then the aqueous starch solution has a solids content of under 50%, preferably from 10 to 35%, and a temperature of over 60° C., preferably from 75 to 90° C. The oxidation and cationization of the natural starch can also be performed simultaneously, but it is preferred that the oxidation is performed before the cationization, because the cationization preferably occurs at higher temperatures than at which the oxidation has to be performed at first because of the gelatinization of native starch.

We have discovered that the best results in co-polymerization are achieved when, unlike in the prior known processes, a starch having a higher molecular weight (i.e. a higher intrinsic viscosity) is used together with a suitable degree of substitution achieved by cationic and/or anionic substituents, and a suitable monomer composition. In the present invention, a suitable monomer composition provides the copolymer to be formed with a good film forming capacity at the minimum film forming temperature (MFT) ranging from–50 to 200° C., preferably from 0 to 100° C., more preferably from 0 to 70° C., even more preferably from 10 to 50° C., and most preferably from 20 to 50° C. Most preferably, a mixture is used containing at least two or more polymerizable monomers, of which at least one monomer is a vinyl monomer. It should be noted that the degree of cationization or an ionization of the starch affects the film forming temperature of the polymer, for example, the higher the cationicity of the starch, the lower the film forming temperature of the polymer dispersion. The starch is preferably added at the beginning of the polymerization, but a portion of it can be added later during a step known as the propagation step of the polymerization.

The monomers used can be, for example, styrene, alpha-methylstyrene, acrylates, acrylonitrile, vinyl acetate etc. A monomer mixture is preferable in which at least one of the two monomers is a hydrophobic monomer, such as styrene.

Therefore, the invention relates to a polymer dispersion which consists of the following components, based on the solids content of the product:

a) from 5 to 50%, preferably from 5 to 40% of starch with a degree of substitution (DS) relative to the cationic or anionic substituents from 0.01 to 1 and an intrinsic viscosity, when cationized and/or anionized, of >1.0 dl/g, b) from 50 to 95%, preferably from 60 to 95%, of a monomer mixture containing at least one vinyl monomer, the film forming temperature of the polymer, which comprises these components, being from –50 to 200° C., preferably from 0 to 100° C., and more preferably from 0 to 70° C., and c) water.

The substituents by which the degree of substitution mentioned above is achieved are preferably cationic, and the starch can further contain additional anionic substituents. The degree of substitution defined above can correspondingly be achieved by anionic substituents, and the starch can further contain cationic substituents.

The degree of substitution, particularly the degree of cationicity, of the starch in the polymer dispersion described above is from 0.04 to 1.0, and the intrinsic viscosity is from 1.5 to 1 5 dl/g. A preferable monomer mixture consists of from 40 to 70% of acrylates and from 30 to 60% of styrene.

The invention also relates to a polymer dispersion which consists of from 5 to 50%, preferably from 5 to 40% of starch, from 0 to 19% of acrylonitrile, from 10 to 60% of acrylates and from 10 to 60% of styrene, based on the solids content of the product, and water.

A preferable polymer dispersion according to the invention consists of from 15 to 40%, preferably from 15 to 35%, of starch, from 5 to 19% of acrylonitrile, from 20 to 50% of acrylates and from 20 to 40% of styrene, based on the solids content of the product, and water.

A particularly preferable polymer dispersion according to the invention contains, based on the solids content of the product, 20% of a starch with a degree of substitution of about 0.05 and an intrinsic viscosity of from 3 to 15 dl/g, 19% of acrylonitrile, 30% of acrylates, preferably butyl acrylate and/or 2-ethylhexylacrylate, 31% of styrene, and water.

An aqueous polymer dispersion, which is ready for use, can have, for example, a solids content of from 10 to 60%, preferably from 20 to 50%, more preferably from 25 to 40%, and most preferably from 25 to 35%.

In the process according to the invention, in order to prepare a polymer dispersion mentioned above, a monomer mixture comprising at least one vinyl monomer is copolymerized in an aqueous solution of a starch, and the polymer thus formed has a film forming temperature of from –0 to 200° C., preferably from 0 to 70° C. The polymerization of the monomers onto the starch can also be performed by the sequential steps of adding each monomer type separately to the reaction mixture and allowing it to be polymerized onto the starch before the addition of the next monomer.

One advantage of the invention is that during the polymerization the viscosity is not increased too much, even if the molecular weight is high. In addition, it has been contemplated that when the degree of substitution of the ionic groups onto the starch is slightly higher and the molecular weight of the starch is high, it has been possible to reduce the amount of acrylonitrile in particular, even below 19%. In this case, it has been discovered that the polymerization evidently proceeds by a mechanism known as the precipitation polymerization. In this mechanism, hydrophobic groups are bound onto the starch molecules, which are completely dissolved in water, and these groups try to detach from the water phase. This causes the precipitation of the chains into initial particles. This stage is called the first polymerization step. Then the initiation occurs in an aqueous solution.

The initiators used can be initiators known per se, for example ammonium or potassium persulfate or peroxides, preferably copper sulfate-hydrogen peroxide redox pair. The polymerization temperature is from 70 to 90° C., preferably from 75 to 80° C., and the pH is below 7, preferably from pH 3 to 5. The addition of the starch is from 2 to 200%, preferably from 10 to 100%, more preferably from 10 to 60%, and most preferably from 10 to 50%, based on the amount of the dry monomer mixture.

The second polymerization step starts when the polymer embryos formed grow and the amount of monomer which is diffused into the growing initial particles is increased. This step is known as the propagation step of the polymerization. The coagulation of the particles is continued until the ionic groups start to stabilize the formed particles. This stabilization in accordance with the DLVO theory results in a stabilized amount of particles and a particle size which is set at an energetically stable range in a way known in colloidal chemistry. The initial particles thus formed act as initial particles for the growing polymer particles. In this case, the mechanism is functioning even without any surface-active agents. In the patent DE 3,702,712, surface-active agents are required as well, which proves that in that case the polymerization proceeds according to the classical Harkins' model (W. D. Harkins, *J. Am. Chem. Soc.*, 69 (1947) 1428), in which the monomers are first situated in micelles, wherein the initiation starts.

The third polymerization step starts when the free monomer has been lined and it is only present in particles. This is known as the termination step. By now the amount, diameter, and surface charges of the polymer particles have been formed.

By using the process according to the invention a copolymer with high strength is provided having a novel composition and branches of suitable length of a synthetic polymer which are polymerized at a suitable distance from each other. Surprisingly, also the amount of the formed homopolymer is quite small.

By using this polymerization method, paper with a good adhesion and cohesive strength is achieved. In addition to that, in the paper making process, the polymer has a good retention and adherence to fibres, and it improves the initial wet strength, which property is especially required by new, fast-speed 'gap former' machines containing e.g. shoe presses. Another clearly observed feature is that polymers made by this procedure make the paper machine cylinders less dirty than most of the other synthetic polymers. In this invention, the surface structure of the polymer is assumed to be such that it enables the formation of hydrogen bonds between the particles and the fibre, but it is, however, easier to be removed from the surface of machinery parts by washing.

Both in the paper pulp and surface sizing applications the polymer has been found to be so fully compatible with the pulp or surface sizing starch used that while the polymer is drying, no separation occurs. Then the paper strengths are at their best.

In surface sizing applications, about from 1 to 10% of polymer is generally used, based on the amount of surface sizing starch. Then the mixture of starch and polymer is normally added to the paper surface by using a size press. Especially in fine paper applications, a more even printability is achieved when the polymer is totally admixed with the surface sizing starch. The ink-jet properties of paper are improved as well, i.e. the paper has a better suitability for colour ink-jet printing. The adherence of polymer to paper fibre can be further improved by slightly increasing the degree of cationicity of starch used in polymer stabilization.

In the following examples, starch 1 is a peroxide-oxidized potato starch having an intrinsic viscosity of 9 dl/g, starch 2 is a hypochlorite-oxidized potato starch having an intrinsic viscosity of 1,5 dl/g, and starch 3 is a hypochlorite-oxidized potato starch having an intrinsic viscosity of 9 dl/g. The solids content of all starches is 82%.

EXAMPLE 1

61.2 parts of starch 1 is slurried with 487 parts of water. To the mixture is added 10 parts of 10% sodium hydroxide solution, and the mixture is heated to 80° C. 12.2 parts of a cationizing chemical (74%) is added, and it is allowed to react for 5 hours. At this step, the degree of cationization of the starch is 0.15 and the intrinsic viscosity is 10 dl/g. The pH of the reaction mixture is lowered by adding 9.1 parts of 5% hydrochloric acid. 10 parts of 0.5% copper(II)sulfate solution is added. The feeding of the monomer mixture, which contains 38.1 parts of acrylonitrile, 100.3 parts of butyl acrylate and 62.2 parts of styrene, and of 5% peroxide solution (110.6 parts) is started simultaneously. The monomer mixture is fed in the course of 5 hours and the peroxide solution in the course of 5.5 hours. The reaction mixture is allowed to react for a further 1 hour. The final product obtained is a dispersion with a solids content of 28%.

EXAMPLE 2

140.6 parts of starch 2 is slurried with 378 parts of water. 24 parts of an aqueous 0.5% copper(II)sulfate solution is added, and the mixture is heated to 80° C. The mixture is allowed to stir at this temperature for about 30 minutes so that the starch will have enough time to dissolve in water. The feeding of the monomer mixture, which contains 115.3 parts of 2-ethylhexyl acrylate and 115.3 parts of styrene, and of 5% peroxide solution (230.5 parts) is started simultaneously. The monomer mixture is fed in the course of 4 hours and the peroxide solution in the course of 4.5 hours. The reaction mixture is allowed to react for a further 1 hour. The final product obtained is a dispersion with a solids content of 34%.

EXAMPLE 3

61.1 parts of a native potato starch and 0.05 parts of copper(II)sulfate is mixed with 554.8 parts of water. To the mixture is added 10 parts of 10% sodium hydroxide solution, and the mixture is heated to 45° C. To the mixture is added 10 parts of 5% hydrogen peroxide solution in the course of 30 minutes, after which the mixture is allowed to stir at 45° C. for a further 1 hour. To the reaction mixture is added 12.2 parts of a cationizing chemical (74%), and the mixture is heated to 80° C., in which temperature it is allowed to react for 4 hours. At this step, the degree of cationicity of the starch is 0.15, and the intrinsic viscosity in the prevailing reaction conditions is about 5 dl/g. The pH of the reaction solution is lowered by adding 9.1 parts of 5% hydrochloric acid. The feeding of the monomer mixture, which contains 38.1 parts of acrylonitrile, 100.3 parts of butyl acrylate and 62.2 parts of styrene, and of 5% peroxide solution (110.6 parts) is started simultaneously. The monomer mixture is fed in the course of 5 hours and the peroxide solution in the course of 5.5 hours. The reaction mixture is allowed to react for a further 1 hour. The final product obtained is a dispersion with a solids content of 26%.

EXAMPLE 4

61.2 parts of starch 3 is slurried with 487 parts of water. To the mixture is added 10 parts of 10% sodium hydroxide solution, and the mixture is heated to 80° C. 4.1 parts of a cationizing chemical is added, and it is allowed to react for 5 hours. At this step, the degree of cationicity of the starch is 0.05 and the intrinsic viscosity is 1.5 dl/g. The pH of the reaction solution is lowered by adding 9.1 parts of 5% hydrochloric acid. 10 parts of 0.5% copper(II)sulfate solution is added. The feeding of the monomer mixture, which contains 38.1 parts of acrylonitrile, 100.3 parts of butyl acrylate and 62.2 parts of styrene, and of 5% peroxide solution (110.6 parts) is started simultaneously. The monomer mixture is fed in the course of 5 hours and the peroxide solution in the course of 5.5 hours. The reaction mixture is allowed to react for a further 1 hour. The final product obtained is a dispersion with a solids content of 28%.

EXAMPLE 5

Comparison of the Dry Strength Effect of an AKD (Alkylketen Dimer) and a Polymeric Size Paper (80 g/m$^2$) was produced by means of an pilot paper machine by using a web width of 1 m and a speed of 80 m/min. The used cellulose was a mixture of birch and pine (60/40) which has been beaten to a freeness of from 25 to 30° SR. In addition, 25% of filler (a mixture of PCC and GCC), based on the total pulp content, 0.8% of pulp starch with a degree of cationicity (DS) of 0.045, and retention agents were used.

Pulp: 60% of birch, 28° SR, 40% of pine, 25° SR
Filler: 17.5% of GCC, 7.5% of PCC
Retention: Percol 162 0.02%, bentonite 0.1%
Pulp starch Raisamyl 145 C

| Size (the amount of active size added, based on the amount of dry pulp) | Tensile strength index [Nm/g] | Porosity [ml/min] |
|---|---|---|
| AKD (0.15%) | 59.9 | 1360 |
| The dispersion of Example 4 (1.5%) | 63.8 | 1020 |

With both the samples, the degree of sizing was the same, the Cobb$_{60}$ values being about 28 g/m$^2$.

EXAMPLE 6

Determination of Inter-laminar Strength

Paper (300 g/m$^2$) was produced in laboratory in a sheet former. The composition of the pulp used was a mixture of brown recycled pulp (60%), mixed recycled pulp (20%) and semipulp (20%). In addition, 2% of spray starch with a degree of cationicity (DS) of 0.015 was used.

| Added material and the amount of the active agent | Interlaminar strength [J/m$^2$] |
|---|---|
| Dispersion acc. To Ex. 4 1.0% | 334 |
| Resin size 0.6% + alum 1.8% | 210 |
| ASA 0.1% + alum 0.5% | 303 |
| AKD 0.1% + alum 0.5% | 326 |

With all the samples, the degree of sizing was at the same level, the Cobb$_{60}$ values ranging from 27 to 29 g/m$^2$.

EXAMPLE 7

Determination of Wet Tensile Strength

Paper (50 g/m$^2$) was produced by means of a pilot paper machine by using a web width of 1 m and a speed of 100 m/min. The sample was taken from the first drying section while the paper was still wet, and it was measured without delay. The pulp used was a typical mechanical pulp used in the newsprint paper manufacture which has been beaten to a freeness of from 66 to 68° SR. In addition, 15% of filler, based on the total pulp content, 0.4% of pulp starch with a degree of cationicity (DS) of 0.2 and retention agents were used.
Pulp: TMP
Filler: Omyalite 60 10%
Retention: Hydrocol 878 0.04%, Hydrocol 0 0.2%
Pulp starch: 0.4%
The dispersion of Example 1: 0.4%

| | Zero point* | The dispersion of Example 1 |
|---|---|---|
| Dry tensile strength index [Nm/g] | 28.2 | 32.1 |
| Wet tensile strength index 1 [Nm/g] | 3.0 | 3.5 |
| Wet tensile strength index 2 [Nm/g] | 7.0 | 8.7 |
| Hydrophobicity [s] | 34 | 89 |
| Porosity [μm/Pas] | 7.78 | 4.55 |

*paper manufactured without using the dispersion prepared in Example 1

While the ash content affects the strength, the ash content of the test point has been taken into account in the wet tensile strength index 2.

Based on the Examples from 5 to 7, the polymer dispersion according to the invention acts both as a dry- and wet-strengthener for paper. On account of its cationic protective colloid, the polymer is retained in anionic fibres. Based on the test data, it can be concluded that the polymer dispersion improves the hydrophobicity of the paper and, unlike the conventional sizing agents which are added to the wet end of the paper, it also improves the strength of the paper.

EXAMPLE 8

Surface Sizing Tests

The cellulose in the base paper (80 g/m$^2$) was a mixture of birch and pine (60/40) which has been beaten to a freeness of about 25° SR. In addition, 25% of filler (PCC), based on the total pulp content, 0.8% of pulp starch with a degree of cationicity (DS) of 0.035 and retention agents were used. The paper was produced by means of a pilot paper machine by using a speed of 80 m/min and a web width of 1 m.

The paper was surface-sized by means of a size press with a cationic (DS of 0.015) 10% potato starch solution to which 5% of dry polymer, based on the amount of dry starch, had been added. The zero point was the starch solution without any polymer.

The HST (Hercules Sizing Test) of the surface-sized papers were measured by using a 2% Acros naphthol green solution in 1% formic acid.

| Zero point | 1 s |
|---|---|
| Example 1 | 97 s |
| Example 2 | 28 s |
| Example 4 | 48 s |
| Comparative Example 1 | 10 s |
| Comparative Example 2 | 24 s |

The Comparative Example 1 was prepared according to the Example 5 of the patent DE 3,702,712. The Comparative Example 2 was prepared according to the Example 4 of the patent publication WO 95/13194 by using, instead of the hydroxypropyl starch, the same oxidized starch as in Example 2.

Comparative Example 1

42.4 parts of hypochlorite-oxidized potato starch with a degree of cationicity (DS) of 0.035 was mixed with 142 parts of water. The mixture was heated to 80° C., after which 26 parts of 10% potassium acetate solution and 18 parts of 1% alpha-amylase solution was added. The mixture was allowed to react for a further 20 minutes, after which 7.5 parts of glacial acetic acid was added. Then 9 parts of 1% copper sulfate solution and 1.75 parts of 30% hydrogen peroxide solution was added. The mixture was allowed to react for 20 minutes, after which the intrinsic viscosity of the solution was measured to be 0.07 dl/g. 1.8 g of 30% hydrogen peroxside solution was added to the mixture. The feeding of the emulsion consisting of 93.7 parts of acrylonitrile, 76.4 parts of butyl acrylate and 0.8 parts of 25% sodium salt of a commercial linear dodecylbenzenesulfonate in 50 parts of water, and of 3.12% peroxide solution (50 parts) was started simultaneously. The emulsion was feeded in the course of 1 hour and the peroxide solution in the course of 1.75 hours. Upon the completion of the peroxide feeding, the mixture was heated at 85° C. for a further 15 minutes. The product obtained was a dispersion with a solids content of 43%.

Comparative Example 2

49.5 parts of starch 2, 0.07 parts of alpha-amylase and 0.07 parts of potassium acetate were mixed with 446.20 parts of water, and the mixture was heated to 85° C. To the mixture was added 0.04 parts of alpha-amylase, and the mixture was allowed to react for a further 20 minutes. To the mixture were added 8.22 parts of glacial acetic acid, 11 parts of 1% copper sulfate solution and 1.14 parts of 30% hydrogen peroxide solution, and the mixture was allowed to stir for a further 20 minutes. The intrinsic viscosity of the mixture was measured to be 0.05 dl/g. To the mixture were added 27.4 parts of methacrylic amidopropylmethyl ammonium chloride, 4.1 parts of acrylic acid and 0.91 parts of 30% hydrogen peroxide. The feeding of the monomer mixture containing 41.1 parts of styrene and 41.1 parts of butyl acrylate, and of 2.1% peroxide solution (58.4 parts) is started simultaneously. The monomer mixture was feeded in the course of 2 hours, and the peroxide solution in the course of 2.25 hours. Upon the completion of the feeding of the peroxide solution, the mixture was allowed to react at 85° C. for a further 1 hour. The product obtained was a dispersion with a solids content of 16%.

The synthesis of the Comparative Example 2 wasn't completely successful. The solids content was lower than assumed, and the dispersion contained 40,000 ppm of unreacted monomer, whereas the amount of unreacted monomer in other Examples of this invention was from 300 to 1,500 ppm. The failure of the synthesis probably results from the fact that the hydroxypropyl chains of the starch used in the original patent are supposed to stabilize the dispersion. In the process according to the present invention, the stabilization is based on a higher molecular weight. This stabilization disappears when the starch is enzymatically degraded in accordance with the process of the publication WO 95/13194. A fairly good sizing is due to the high amount of the residual hydrophobic monomer in the dispersion. The hydrophobicity of the paper increases as these monomers are absorbed into the paper. However, the monomers are unwholesome substances with a strong smell, and therefore it is not desirable that the dispersion contains high concentrations of these substances.

Based on the surface sizing results, by the polymer dispersion according to the invention a greater improvement in the ink resistance is achieved than by the polymer dispersions which are prior known or used here in the Comparative Examples. In our other studies, the ink resistance (HST) of the paper has been found to correlate with the water resistance and ink-jet properties of the paper. When the ink resistance is improved, the water resistance and ink-jet properties of the paper are improved as well.

What is claimed is:
1. A polymer dispersion prepared according to the following process comprising:
 a) providing from 5 to 50% by weight of starch with a degree of substitution from 0.01 to 1 relative to at least one member selected from the group consisting of cationic or anionic substitute and having an intrinsic viscosity of greater than 1.0 dl/g when substituted; and
 b) combining the starch with water and 50 to 95% by weight of a monomer mixture comprising at least one vinyl monomer, wherein the percents by weight are based on the solid content of the dispersion, and the film forming temperature of the polymer formed from the monomer mixture is from −50 to 200° C.
2. The polymer dispersion according to claim 1, wherein the degree of substitution of the starch is from 0.04 to 1.0 and the intrinsic viscosity is from 1.5 to 15 dl/g.
3. The polymer dispersion according to claim 1, wherein the film forming temperature is from 10 to 50°.
4. The polymer dispersion according to claim 1, wherein the monomer mixture comprises from 40 to 70% of aerylates and from 30 to 60% of styrene.
5. The polymer dispersion according to claim 1, wherein the dispersion comprises:
 from 5 to 50% of starch,
 from 0 to 19% of acrylonitrile,
 from 10 to 60% of acrylates,
 from 10 to 60% of styrene, and water.
6. The polymer dispersion according to claim 5, where the dispersion comprises
 from 15 to 40%, of starch
 from 5 to 19% of acrylonitrile,
 from 20 to 50% of acrylates, and
 from 20 to 40% of styrene, and water.
7. The polymer dispersion according to claim 1, consisting essentially of
 20% of starch with a degree of substitution of about 0.05 and an intrinsic viscosity of from 3 to 15 dl/g,
 19% of acrylonitrile,
 30% of acrylates,
 31% of styrene, and water.
8. The polymer dispersion according to claim 1, wherein the film forming temperature is from 0 to 70° C.
9. The polymer dispersion according to claim 1, wherein the starch is dissolved in an aqueous alkaline solution at a temperature of over 60° C.
10. The polymer dispersion according to claim 1, wherein the polymer is formed at a temperature from 70 to 90° C. and at a pH below 7.
11. The process according to claim 1, wherein the starch is anionized, cationized, or anionized and cationized.
12. The polymer dispersion according to claim 1, wherein the polymer dispersion is used in paper manufacture.
13. The polymer dispersion according to claim 1, wherein the polymer dispersion is used as a surface sizing additive for paper.
14. The polymer dispersion according to claim 1, wherein the polymer dispersion is used as a wet and dry-strengthener for paper which is added to the wet end of the paper machine.
15. The polymer dispersion according to claim 1, wherein the polymer dispersion is used as a pulp size.
16. The polymer dispersion according to claim 1 wherein the film forming temperature is from 20 to 50° C.
17. The polymer dispersion according to claim 2, wherein the monomer mixture comprises from 40 to 70% of acrylates and from 30 to 60% of styrene.

18. The polymer dispersion according to claim 3, wherein the monomer mixture comprises from 40 to 70% of acrylates and from 30 to 60% of styrene.

19. The polymer dispersion according to claim 1, wherein the dispersion comprises:
   from 5 to 40% of starch,
   from 0 to 19% of acrylonitrile,
   from 10 to 60% of acrylates,
   from 10 to 60% of styrene, and water.

20. The polymer dispersion according to claim 2, wherein the dispersion comprises:
   from 5 to 40% of starch,
   from 0 to 19% of acrylonitrile,
   from 10 to 60% of acrylates,
   from 10 to 60% of styrene, and water.

21. The polymer dispersion according to claim 1, wherein the starch accounts for 5 to 40% of the solids content, and the monomer mixture accounts for 60 to 95% of the solids content.

22. The polymer dispersion according to claim 1, wherein the film forming temperature is selected from a temperature in a temperature range selected from the group consisting of 0 to 100° C., 0 to 70° C., and 10 to 50° C.

23. The polymer dispersion according to claim 22, wherein the temperature range is 0 to 70° C.

24. The polymer dispersion according to claim 8, wherein the film forming temperature is from 10 to 50° C.

25. The polymer dispersion according to claim 1, wherein the starch is cationized and is prepared by contacting native starch with a cationizing chemical containing a quaternary nitrogen.

26. The polymer dispersion according to claim 25, wherein the cationizing chemical is a 1,3-epoxy quaternary or 1,3 hydrochloride.

27. The polymer dispersion according to claim 6, wherein the starch is cationized and is prepared by contacting native starch with a cationizing chemical containing a quaternary nitrogen.

28. The polymer dispersion according to claim 1, wherein the starch is cationized to provide a degree of substitution from 0.01 to 0.08.

29. The polymer dispersion according to claim 1, wherein the starch is cationized to provide a degree of substitution from 0.1 to 0.5.

30. The polymer dispersion according to claim 6, wherein the degree of substitution of the starch is from 0.04 to 1.0 and the intrinsic viscosity is from 1.5 to 15 dl/g.

* * * * *